United States Patent [19]
Wallack et al.

[11] Patent Number: 5,433,973
[45] Date of Patent: Jul. 18, 1995

[54] METHOD OF COATING A MAGNETIC RECORDING MEDIA COATING ONTO A SUBSTRATE

[75] Inventors: David A. Wallack, Tokyo, Japan; Robert A. Yapel, Oakdale; David J. Lundberg, Maplewood, both of Minn.

[73] Assignee: Minnesota Mining and Manufacturing Company, St. Paul, Minn.

[21] Appl. No.: 249,459

[22] Filed: May 26, 1994

[51] Int. Cl.$^6$ ............................................. H01F 10/02
[52] U.S. Cl. ..................................... 427/128; 427/131
[58] Field of Search ............................. 427/127–132, 427/599; 428/900, 594, 595

[56] References Cited

U.S. PATENT DOCUMENTS

| | | | |
|---|---|---|---|
| 4,851,289 | 7/1989 | Ogawa et al. | 428/329 |
| 4,863,793 | 9/1989 | Ogawa et al. | 428/323 |
| 5,000,997 | 3/1991 | Ritchie et al. | 428/78 |
| 5,114,778 | 5/1992 | Yanai et al. | 428/141 |
| 5,162,183 | 11/1992 | Lindblad et al. | 430/59 |

FOREIGN PATENT DOCUMENTS 56-41421 3/1983 Japan ............................. G11B 5/66

OTHER PUBLICATIONS

"Cellular Convection in Polymer Coatings–an Assessment," by C. M. Hansen and P. E. Pierce, *Ind. Eng. Chem. Prod. Res. Develop.*, vol. 12, No. 1, 1973, pp. 67–70; (no month available).

"Surface Deformation of Thin Coatings Caused by Evaporative Convection," (I), by J. N. Anand and R. Z. Balwinski, *Journal of Colloid and Interface Science*, vol. 31, No. 2, Oct. 1969, pp. 196–202.

"Surface Deformation of Thin Coatings Caused by Evaporative Convection," (II), by J. N. Anand, *Journal of Colloid and Interface Science*, vol. 31, No. 2, Oct. 1969, pp. 203–207.

"Surface Deformation of Thin Coatings Caused By Evaporative Convection," (III) by J. N. Anand and H. J. Karam, *Journal of Colloid and Interface Science*, vol. 31, No. 2, Oct. 1969, pp. 208–215.

"Interfacial Hydrodynamics: An Overview," by John Berg, *Canadian Metallurgical Quarterly*, vol. 21, No. 2, 1982 pp. 121–136.

"Flotation in Paints–A Suggested Mechanism," by I. Ferguson, *Journal of The Oil & Colour Chemists' Association*, vol. 42, No. 8, pp. 529–542, Aug. 1959.

*Primary Examiner*—Bernard Pianalto
*Attorney, Agent, or Firm*—Gary L. Griswold; Walter N. Kirn; David B. Kagan

[57] ABSTRACT

A method of depositing a magnetic recording media coating onto a substrate, wherein the coating is substantially free of Benard Cells, the method comprising the steps of: (a) providing a dispersion comprising a polymeric binder, a pigment, and a solvent; (b) coating the dispersion onto a surface of the substrate; (c) drying the dispersion; (d) calculating values comprising $\mu$, $\beta$, and d representing the viscosity, temperature gradient, and wet caliper of the dispersion, respectively; and (e) during the course of carrying out steps (a), (b), and (c), maintaining the ratio $$\frac{\beta d^2}{\mu}$$

below a threshold value sufficient to substantially prevent the formation of Benard Cells in the magnetic recording media coating.

22 Claims, 2 Drawing Sheets

METHOD OF COATING A MAGNETIC RECORDING MEDIA COATING ONTO A SUBSTRATE

FIELD OF THE INVENTION

The present invention relates to the production of magnetic recording media, and in particular to the coating of a backside or a magnetic side coating onto a magnetic recording media substrate.

BACKGROUND OF THE INVENTION

Magnetic recording media such as audio and video magnetic recording tapes and computer cartridge tapes are constructed of a magnetic recording layer provided on a nonmagnetic substrate. The backside of the substrate is optionally provided with a backside coating in order to enhance the running properties of the media. The magnetic recording media coatings (backside coating and magnetic coating) are often coated in the form of a solvent-based dispersion which generally comprise a binder and a pigment dispersed in a solvent.

In the field of magnetic recording media, particularly audio and video recording tapes, data cartridge tapes, and the like, electromagnetic performance properties of a magnetic recording tape are important to overall product performance. An example of a deleterious property of a magnetic recording medium is dropout of data. Dropout is generally defined as variation (reduction) in the signal level of reproduced, tape-recorded data, resulting in an error in data reproduction. Jorgenson, The Complete Handbook of Magnetic Recording, 691 (3ed. 1988).

Data dropout has been attributed to various causes, including the presence of foreign particles on a magnetic recording tape, embossing of the magnetic layer, and other general imperfections of the magnetic recording layer. Practitioners have proposed various approaches for alleviating the problem of dropouts. For example, Japanese Patent Kokai No. SHO 56[1981]-139030 attempts to solve the problem of "output fluctuation" by adding a surfactant to the backcoat.

Some practitioners have observed that undesired texture in the backside coating may cause deterioration of electromagnetic properties. In U.S. Pat. No. 4,851,289 (Ogawa et al.), the inventors state that surface properties and electromagnetic properties are deteriorated by the "orange peel" of the backing layer caused by making the layer thick. Col. 1 lines 61-65. Ogawa et al. address these problems by providing recording media with a plurality of magnetic layers, the ferromagnetic particles in the uppermost layer having a magnetic crystal size smaller than those of any lower levels. Col. 2 lines 28-32

U.S. Pat. No. 5,114,778 (Yanai et al.) recites that an uneven orange peel texture is formed in coatings of high molecular weight compounds, based upon a convection cell known as "Bernard (sic) Cells." Benard Cells have been defined as "polymer coating defects [arising] from circulatory motion within the liquid film after it has been applied". Charles M. Hansen and Percy E. Pierce, *Cellular Convection in Polymer Coatings—An Assessment*, 12 Ind. Eng. Chem. Prod. Res. Develop. 67 (1973). Yanai et al. viewed this texture as beneficial, and claimed an invention comprising a magnetic recording layer, and an underlayer "composed mainly of a resin compound having on the surface thereof an uneven orange peel texture." Col. 11 lines 11-12. The object of Yanai et al. is to provide a magnetic recording medium having a constant friction coefficient after repeated use, stable running properties, excellent durability, and excellent electromagnetic characteristics. Col. 2 lines 18-21. Yanai et al. pursue these results by positioning a magnetic recording layer upon an underlayer of high molecular weight polymer that is intentionally characterized by an uneven orange peel texture appearing regularly throughout the surface of the medium. Col. 5 lines 50-55.

The paint industry has long recognized natural phenomena associated with solvent evaporation. Some of these phenomena, i.e. pigment flotation and the formation of hexagonal cells (i.e. Benard Cells), are discussed in I. Ferguson, *Flotation in Paints—A Suggested Mechanism*, 42 Journal of the Oil & Colour Chemists' Ass., August 1959 at 529. Being apparent to the naked eye, Benard Cells are objectionable to members of the paint industry. Thus, Ferguson attempted to explain and offer possible means of controlling Benard Cell formation.

Ferguson proposed that a mechanism for the formation of Benard Cells is a vortex action caused by solvent evaporation. In this regard, Ferguson postulated that the heat of vaporization of the solvent in the paint may give rise to a temperature gradient causing the evaporating surface to acquire a lower temperature than the remainder of the paint film and thereby producing vertical convection currents. Ferguson at 530-531.

In addition to temperature gradients, other factors are thought to influence the formation of convective currents and thereby create Benard Cells. Researchers have combined the effects of the temperature variation of surface tension ($-d\sigma/dT$), temperature gradient ($\beta$), film thickness (d), viscosity ($\mu$) and thermal diffusivity (K), to arrive at the dimensionless Marangoni number, B:

$$B = \frac{(-d\sigma/dT)\beta d^2}{\mu K}$$

If a critical Marangoni number is exceeded, Benard Cells are predicted to form by surface tension effects. Hansen and Pierce supra at 67.

SUMMARY OF THE INVENTION

The present invention is based, in part, upon the discovery that dropouts in a magnetic recording medium are related to the formation of Benard Cells in the backside and/or magnetic coating of a magnetic recording media. We have discovered that electromagnetic properties can be generally improved, and more specifically that dropouts can be reduced, by substantially eliminating the presence of Benard Cells in magnetic recording media backside and/or magnetic coatings. The present invention is further based, in part, on the discovery that the formation of Benard Cells in magnetic and backside coatings can be substantially prevented by adjusting one or more of the factors: ($-d\sigma/dT$), $\mu$, K, $\beta$, and d, which represent the temperature variation of surface tension, viscosity, thermal diffusivity, temperature gradient, and wet caliper of the backside dispersion, respectively.

An aspect of the present invention is a method of depositing a magnetic recording media coating onto a substrate, wherein the coating is substantially free of Benard Cells. The method includes the steps of: (a) providing a dispersion comprising a polymeric binder, a pigment, and a solvent; (b) coating the dispersion onto a surface of the substrate; (c) drying the dispersion; (d) calculating values comprising $\mu$, $\beta$, and d representing the viscosity, temperature gradient, and wet caliper of the dispersion, respectively; and (e) during the course of carrying out steps (a), (b), and (c), maintaining the ratio $$\frac{\beta d^2}{\mu}$$

below a threshold value sufficient to substantially prevent the formation of Benard Cells in the magnetic recording media coating.

Another aspect of the present invention provides a method of depositing a magnetic recording media coating onto a substrate, wherein the coating is substantially free of Benard Cells. The method includes the steps of: (a) providing a dispersion comprising a polymeric binder, a pigment, and a solvent; (b) coating the dispersion onto a surface of the substrate; (c) drying the dispersion; (d) calculating the Marangoni number B of the dispersion according to the formula:

$$B = \frac{(-d\sigma/dT)\beta d^2}{\mu K}$$

wherein $(-d\sigma/dT)$, $\mu$, $K$, $\beta$, and d represent the temperature variation of surface tension, viscosity, thermal diffusivity, temperature gradient, and wet caliper of the dispersion, respectively; and (e) during the course of carrying out steps (a), (b), and (c), maintaining the Marangoni number of the dispersion below a threshold value sufficient to substantially prevent the formation of Benard Cells in the magnetic recording media coating.

In the practice of the present invention, "magnetic recording media coating" means a backside coating and/or a magnetic coating.

DETAILED DESCRIPTION OF THE INVENTION

The present invention provides a method of depositing onto a substrate a magnetic recording media coating, wherein the coating is substantially free of Benard Cells. The presence of Benard Cells can be determined by examining a dried coating sample under an optical microscope, using transmitted light. See FIGS. 1 and 2. Due to uneven pigment concentration, samples of backside coatings with Benard Cells (FIG. 1) transmit light in a distinct cell-like pattern. Contrariwise, a backside coating which is substantially free of Benard Cells (FIG. 2) transmits light more uniformly.

Magnetic recording media coatings that are substantially free of Benard Cells show generally improved electromagnetic performance characteristics, as compared to coatings in which Benard Cells are present. For example, backside coatings which contain substantially no Benard Cells will be less likely to show embossing effects in the magnetic side coating of the media and will thereby result in a smoother magnetic side coating. The resulting relatively smoother magnetic side coating will be capable of running at a lower head to tape spacing, thus exhibiting reduced signal loss, and more specifically, decreased dropout of data. Moreover, it is believed that Benard Cells in the magnetic coating will also cause signal loss and dropouts.

The method of the present invention comprises the step of providing a dispersion comprising a polymeric binder, a pigment, and a solvent. Polymeric binder components useful in the practice of the present invention can be any polymer, or combination of polymers, known to be useful in the production of magnetic recording media coatings, for example, polyurethanes, polyesters, phenoxy resins, epoxies, nitrocellulose, vinyl copolymers, polyureas, combinations of such polymers, and the like. For backside coatings, a preferred polymeric binder component comprises a polyurethane in combination with a phenoxy resin. Useful amounts of the polymeric binder can be amounts between about 4 and 8 parts by weight (pbw), with preferred amounts being between 5 and 6 pbw, based on 100 parts backside coating dispersion, including the solvent.

Depending upon whether the coating is a backside coating or a magnetic coating, the pigment used can either be magnetic or nonmagnetic. Nonmagnetic pigments which may be useful in the practice of the present invention are, for example, $Al_2O_3$, $TiO_2$, carbon black, and the like, known to be useful in the art. For backside coatings, useful amounts of pigment in a dispersion can vary, but are preferably present at a level below about 15 parts by weight, and are most preferably present at a level within the range from about 2 to 7 parts by weight based on 100 parts dispersion.

For magnetic coatings, the dispersion may contain magnetic pigments. Magnetic pigments which may be useful in the practice of the present invention include any suitable magnetic pigment known in the art, for example magnetic iron oxides such as $\gamma$-$Fe_2O_3$, Co-containing $\gamma$-$Fe_2O_3$, $\gamma$-$Fe_3O_4$, Co-containing $\gamma$-$Fe_3O_4$; $CrO_2$; barium ferrites; or metal magnetic powder principally comprising Fe, Ni, and Co, e.g., Fe—Ni—Co alloy, Fe—Ni alloy, Fe—Al alloy, Fe—Al—Zn alloy, Fe—Al—Ni—Co alloy, Fe—Al—Ni—Cr alloy, Fe—Al—Co—Cr alloy, Fe—Co—Ni—Cr alloy, Fe—Co—Ni—P alloy, and Co—Ni alloy.

Solvents useful in the practice of the present invention can be any solvent that is useful in coating a dispersion for a magnetic recording media coating; i.e. a solvent capable, alone or in the presence of dispersants, wetting agents, and the like, of dispersing the binder and the pigment, and evaporating upon exposure to a heated atmosphere to leave behind the magnetic or backside coating. Such solvents include, for example, toluene, methyl ethyl ketone (MEK), tetrahydrofuran (THF), cyclohexanone, methyl isobutyl ketone, and xylene, or mixtures thereof, with THF, toluene, MEK, and cyclohexanone being preferred. In terms of the present invention, the solvent comprises all solvents that are part of the dispersion, whether added as a solvent with another ingredient, or added separately. For backside coatings, solvent is preferably present in amounts within the range from 83 to 92 parts by weight solvent, based on 1 00 parts dispersion.

In one embodiment of the present invention particularly suited for use as a backside coating for computer data cartridge tapes, a preferred solvent comprises a mixture of THF, toluene, and MEK in amounts ranging from 65 to 80 pbw THF, 0 to 10 pbw toluene, and 0 to 10 pbw MEK, most preferably from about 68 to 77 pbw THF, from about 4 to 8 pbw toluene, and from about 4 to 8 pbw MEK, based on 100 parts dispersion. In another embodiment of the present invention, particularly suited for use as a backside coating with video cassette tapes, a preferred solvent comprises a mixture of MEK, toluene, and cyclohexanone in amounts ranging from 40 to 80 pbw MEK, 15 to 75 pbw toluene, and 0 to 30 pbw cyclohexanone, most preferably from about 45 to 65 pbw MEK, from about 25 to 40 pbw toluene, and from about 0 to 10 pbw cyclohexanone.

In addition to pigment, solvent, and binder components, a backside or magnetic side dispersion may also include various other conventional additives such as, catalyst, crosslinkers, wetting agents, thermal stabilizers, antioxidants, antistatic agents, surfactants, coating aids, dispersants, fungicides, bactericides, lubricants, and the like, in accordance with practices known in the art. The dispersion may be produced by mixing and/or milling the ingredients by any means known to be useful to produce such dispersions. Prior to coating the dispersion onto a substrate, a crosslinking agent and catalyst, as desired, may be blended into the dispersion. For example, if one or more hydroxy-functional polymers are used as the polymeric binder, a suitable crosslinking agent is a multifunctional isocyanate compound such as CB-601 crosslinking agent, available from Miles, Inc.

After the dispersion has been prepared, the dispersion is coated onto a surface of a magnetic recording media substrate. The substrate may be formed from any material known to be useful in the production of magnetic recording media. Examples of suitable substrate materials are polymers such as polyethylene terephthalate, polyimide, and polyethylene naphthalate. The thickness of the substrate may vary, but a substrate thickness in the range from 4 to 15 $\mu$m is generally suitable.

Any method of coating a backside or magnetic side dispersion onto a magnetic recording media substrate can be used in the practice of the present invention. Useful coating techniques are, for example, gravure coating, modifications of gravure coating techniques, hydro-pneumatic coating techniques, curtain coating, and the like. Generally, a preferred coating operation comprises a coating station, a drying oven, and means to support and transport the substrate through the operation. Preferably, the process provides for continuous coating and drying of magnetic and/or backside dispersions onto a substrate. The magnetic layer may be coated onto one surface of the substrate either before or after the backside dispersion is coated onto the opposite surface of the substrate.

After being coated, the dispersion is dried. Preferably, drying of the dispersion can be accomplished by exposing the coated dispersion to a heated atmosphere. For example, after passing through a coating station, the coated substrate can pass through a drying oven where heated air dries the solvent, leaving behind the solids as the dried backside or magnetic side coating. If radiation curable polymer materials are used in the coating, the coating may be exposed to a suitable source of radiation, e.g., electron beam radiation, after the dispersion is dried.

It is believed that Benard Cell formation within a magnetic recording media coating can occur during the coating and/or drying of the dispersion. The present invention provides a method for predicting the formation of Benard Cells by calculating values comprising $\beta$, d, and $\mu$, which represent the temperature gradient, wet caliper, and viscosity of the dispersion. The ratio $$\frac{\beta d^2}{\mu} \quad \text{(a-1)}$$

can be maintained below a threshold value in order to produce a magnetic recording media coating which is substantially free of Benard Cells.

In a preferred embodiment of the present invention, in addition to the values $\beta$, d, and $\mu$, values further comprising K and $(-d\sigma/dT)$ are used to calculate the Marangoni number of the magnetic recording media dispersion. The Marangoni number of the dispersion can be used to predict Benard Cell formation. Like the ratio $\beta d^2/\mu$, the Marangoni number can be maintained below a threshold value, $B_T$, in order to produce a magnetic recording media coating which is substantially free of Benard Cells. The Marangoni number, B, of a dispersion can be calculated according to the formula $$B = \frac{(-d\sigma/dT)\beta d^2}{\mu K} \quad \text{(a-2)}$$

The factors $(-d\sigma/dT)$, $\mu$, K, $\beta$, and d (collectively, the Marangoni factors) represent the temperature variation of surface tension, viscosity, thermal diffusivity, temperature gradient, and wet caliper of the dispersion, respectively.

In the practice of the present invention, the viscosity, $\mu$, can be measured by various techniques. For magnetic side dispersions, the viscosity, $\mu$, is preferably measured at the time of coating by a Bohlin VOR viscometer. For backside dispersions $\mu$ is preferably the ICI viscosity of the dispersion at the time of coating, as measured by any commercially available ICI viscometer. For computer data cartridge tapes, preferred viscosity values for a backside dispersion are in the range from 10 to 100 centipoise (cp), with the range from about 10 to 60 cp being most preferred. For video cassette tape backside dispersions, preferred viscosity values are in the range from about 4 to 8 centipoise, with a viscosity of about 6 cp being most preferred.

The wet caliper d is the thickness of the backside or magnetic side coating at the time of coating. The wet caliper is a function of the coating process. For instance, if gravure coating is the coating method used, the wet caliper is a function of the knurl roll that is used to apply the dispersion. The wet caliper is also a function of the viscosity and solids percent of the dispersion as coated. The value of the wet caliper can preferably be calculated from measuring the dried coating caliper with a differential gauging system such as a Brunswick XL-750 apparatus. From the dry caliper the wet caliper d can be determined by back-calculating based on the volume fraction of non-volatile dispersion components.

The temperature variation in surface tension, $-d\sigma/dT$, of the dispersion is effectively equal to the $-d\sigma/dT$ of the solvent. Because the value of $-d\sigma/dT$ is near 0.1 dyne/cm° C. for all liquids, the value of $-d\sigma/dT$ for the dispersion is equal to 0.1 dyne/cm° C. in the practice of the present invention. See John Berg, *Interfacial Hydrodynamics: An Overview*, 21 *Canadian Metallurgical Quarterly* 121, 127 (1982). Optionally, if more accurate values of $-d\sigma/dT$ are desired, these values can be found experimentally by measuring the change in surface tension relative to temperature of the exact solvent being used.

K is the thermal diffusivity of the solvent and can be determined from the formula $$K = \frac{k}{\rho C_v} \quad \text{(b)}$$

wherein k is the thermal conductivity of the solvent, $\rho$ is the density of the solvent, and $C_v$ is the specific heat of the solvent. J. N. Anand and H. J. Karam, *Surface Deformation of Thin Coatings Caused by Evaporative Convection*, 31 Journal of Colloid and Interface Science, 208, 212 (1969). The density($\rho$), specific heat($C_v$), and thermal conductivity(k) values can be determined experimentally, or taken from compiled references such as Daubert & Danner *Physical and Thermodynamic Properties of Pure Chemicals—Data Compilation* (1992). Where the solvent contains more than one kind of solvent, the overall value of K is calculated to be a weighted average of the different solvent components. For example, if a solvent contains 40 weight percent MEK and 60 weight percent toluene, K for the solvent is given by $K = 0.40 K_m + 0.60 K_t$, where $K_m$ is the thermal diffusivity of the MEK, and $K_t$ is the thermal diffusivity of the toluene.

Generally, $\beta$ is the temperature gradient during drying that develops across the wet caliper, d, of the coated dispersion subsequent to coating, but before the coating is dry. A variety of techniques may be used to calculate $\beta$, and the magnitude of $\beta$ will vary depending upon which technique is chosen. Nonetheless, the technique used to determine $\beta$ is not critical so long as the same technique is used for calculating both (1) the ratio $\beta d^2/\mu$ or the Marangoni number, B, of the, dispersion, and (2) the critical ratio $\beta d^2/\mu$ or the threshold value $B_T$, above which Benard Cells form in a magnetic recording media coating.

According to a first preferred approach, $\beta$ is calculated as $$\beta = \frac{T_C - T_S}{d} \quad \text{(c)}$$

wherein the value $T_s$ is the surface temperature of the coated dispersion taken at a point in the drying process where Benard Cells are believed to form, e.g. the coated dispersion is still substantially a flowable liquid, prior to becoming dry to the touch. For example, a preferred rule of thumb is to measure $T_s$ and $T_c$ prior to when the coated surface becomes tacky. The value d is the wet caliper of the coated dispersion.

The value $T_c$ is the surface temperature of the uncoated substrate, measured at the same point in the coating/drying operation as $T_s$ was measured, and under normal coating conditions (with the exception that the dispersion is not being coated onto the substrate). The value of $T_c$ can be conveniently measured during the start-up stage of a coating operation. A preferred point at which to take the measurements is shortly after the substrate enters the drying oven. The values of $T_c$ and $T_s$ can be measured with an IR pyrometer such as an OMEGA SCOPE Series 2000A model from Omega Engineering Inc. This first technique generally provides values in the range from 4500° to 40,000° C./cm.

According to a second preferred approach, wherein a magnetic recording media coating is coated onto an uncoated substrate, $\beta$ can be calculated after coating from the equation (c), wherein $T_s$ is as defined above, but $T_c$ is the temperature of the bottom surface of the coated substrate, measured at the same point in the drying process as $T_s$. By this method d is the wet caliper of the coated dispersion plus the thickness of the substrate. The second method generally provides values in the range from 0° to 1000° C./cm. As another alternative, $T_c$ could be taken to be the oven temperature.

A threshold value $B_T$, or a critical ratio $\beta d^2/\mu$, above which Benard Cells will form in a magnetic recording media coating, can be determined experimentally. For example, when using the Marangoni number to predict Benard Cell formation, a dispersion can be coated at a relatively low Marangoni number, after which it is determined whether Benard Cells are present in the resultant dried magnetic recording media coating. Then, one or more of the Marangoni factor can be adjusted to incrementally raise or lower the Marangoni number, as desired. The Marangoni number at which Benard Cells begin forming is the threshold value $B_T$. A similar approach can be used to calculate a critical ratio $\beta d^2/\mu$, above which Benard Cells form in a magnetic recording media coating.

When using the first preferred approach for determining $\beta$, our evaluations have shown that a typical threshold Marangoni number, $B_T$, can be from approximately 5 to approximately 9, and is often between 6 and 8, as used with our backside coating formulations. This range may vary significantly for other operations and formulations, and by altering the methods of determining the Marangoni factors.

By first determining a threshold value of $B_T$ or $\beta d^2/\mu$ above which Benard Cells form, and thereafter (during the dispersion production, coating, and drying steps), adjusting one or more of the Marangoni factors to maintain the Marangoni number or ratio $\beta d^2/\mu$ of the dispersion below the threshold value, the present invention provides a method to substantially prevent the formation of Benard Cells in magnetic recording media coatings.

For example, the Marangoni number of a dispersion can be maintained below a threshold value $B_T$, by adjusting the thermal diffusivity (K) of the solvent. The thermal diffusivity of a solvent can be adjusted by varying the composition of the solvent. A useful solvent can have a thermal diffusivity which, when considered with the other Marangoni factors, results in a Marangoni number which does not exceed the threshold value for the formation of Benard Cells. If the Marangoni number is above the threshold value $B_T$, and Benard Cells form in the dried coating, K can be increased in order to decrease B. A preferred value for the thermal diffusivity of the solvent can be in the range from about 0.0007 to 0.001 cm$^2$/sec.

The Marangoni number of a dispersion can also be maintained below a threshold value by adjusting the viscosity of the dispersion. A useful viscosity is a viscosity which, when considered with the other Marangoni factors, results in a Marangoni number which does not exceed the threshold value for the formation of Benard Cells. If the Marangoni number is above the threshold value, and Benard Cells form in the dried magnetic recording media coating, the dispersion viscosity can be increased in order to decrease B.

In the practice of the present invention, the viscosity of a dispersion can preferably be adjusted by varying the solids percentage of the dispersion, which can be varied by using more or less solvent (solvent weight plus solids weight equals total dispersion weight), as desired. Generally, increasing the solids percentage will increase dispersion viscosity, and vice versa. Useful solids percentages are values which result in a dispersion having a useful viscosity value, and therefore a Marangoni number below the threshold value. For backside dispersions, a preferred solids percentage is in the range from about 8 to 17% with the range from 9 to 16% being particularly preferred, and the range from 10 to 15% being most preferred.

The viscosity of the dispersion may also be adjusted by other methods, for example by varying the amount of dispersant present in the dispersion, or by varying the weight ratio of pigment to binder (including activator). Generally, for dispersions of the present invention, an increased amount of dispersant will decrease the dispersion viscosity, whereas adding relatively more binder to pigment will increase the dispersion viscosity. For backside dispersions, preferred amounts of dispersant are in the range from about 0.05 to about 0.5 parts by weight, based on 100 parts dispersion, and preferred pigment to binder ratios are in the range from about 1:5 to about 1:1.

The Marangoni number of a dispersion also can be maintained below a threshold value by adjusting the wet caliper (d) of the dispersion. A useful wet caliper is one which, when considered with the other Marangoni factors, results in a Marangoni number not exceeding the threshold value for Benard Cell formation. If the Marangoni number is above the threshold value, and Benard Cells form in the dried magnetic or backside coating, wet caliper can be decreased in order to decrease the Marangoni number B. For backside dispersions, preferred wet caliper values within the range from about 3 to 18 $\mu$m, with the range from about 3 to 14.5 $\mu$m being most preferred.

The Marangoni number of a dispersion can also be maintained below a threshold value by adjusting the temperature gradient of the dispersion. A useful temperature gradient is one which, when considered with the other Marangoni factors, results in a Marangoni number not exceeding the threshold value for Benard Cell formation. If the Marangoni number is above the threshold value, and Benard Cells form in the dried backside or magnetic side coating, the temperature gradient can be decreased in order to decrease the Marangoni number B.

The value of $\beta$ can be adjusted by varying one or more of the factors which affect $T_s$ and $T_c$, and d. With respect to $T_s$ and $T_c$, these include the ambient coating temperature, temperatures of the drying oven, the dispersion, temperatures of pull rolls contacting the substrate, the speed at which the web passes through the drying oven (at a given point in the oven, $T_s$ will decrease as the web speed increases), and the like. The value of d can be adjusted by the use of different coating techniques which are known to be useful in the art. As determined by the first method of measuring $T_s$, preferred values of $\beta$ are within the range from about 4,500° to 40,000° C./cm.

The present invention will now be more fully described with reference to the following illustrative examples.

EXAMPLE 1

Magnetic media backside dispersions were produced from the ingredients in Table 1. The viscosity and Marangoni numbers of the dispersions were adjusted by varying the solids percent of the dispersion. The solids percent was varied by adding different levels of solvent to Samples 1–4 and 5–8.

TABLE 1

| | | Parts by weight | |
|---|---|---|---|
| | INGREDIENT | Samples 1–4 | Samples 5–8 |
| Alumina | Al$_2$O$_3$ (0.5 $\mu$m) (50% solids in THF) | 0.8 | 0.7 |
| Main Charge | Acetylene Carbon black from Chevron | 4.7 | 3.9 |
| | Phosphorylated Polyoxyalkyl Polyol* (75% solids in Toluene) | 0.1 | 0.1 |
| | Emcol Acetate from Witco Corp. | 0.1 | 0.1 |
| | Estane 5707 Polyurethane Resin from BF Goodrich (15% solids in THF) | 25.2 | 21.1 |
| | PKHH Phenoxy resin from Union Carbide (25% solids in 60% MEK / 40% Toluene) | 10.2 | 8.6 |
| Solvent | MEK | 1.7 | 1.4 |
| | Toluene | 3.3 | 2.8 |
| | THF | 50.7 | 58.7 |
| Activator | CB-601 isocyanate crosslinking agent from Miles Inc. (60% solids in PM Acetate) | 3.2 | 2.6 |

*Material is described in U.S. Pat. No.5,028,483 col. 5 lines 32–45.

The ingredients of the Main Charges were mixed together with the solvents, and milled until smooth. The alumina was milled in THF until the particles had a mean particle size of 0.5 $\mu$m, and then added to the other charges. The entire solution was mixed in a high speed mixer. Just before coating, the activator was added.

Each dispersion was coated onto a 6.5 micron polyethylene terephthalate (PET) substrate. The backsides were coated first, and coating of the magnetic side followed on the opposite surface of the substrate. The coated web was slit to 0.635 cm strands and wound onto a hub to a length of about 4000 meters. Three strands corresponding to the left, center, and right positions of the coated web were tested for each sample. Test results are given in Table 2.

The wet caliper and viscosity of each coated dispersion were monitored and are also given in Table 2. The thermal diffusivity K of each dispersion was taken to be the thermal diffusivity values of the solvents, approximately equal to 0.001 cm$^2$/s. The temperature variation of surface tension of the dispersions were taken to be the value of $-d\sigma/dT$ of the solvents, equal to 0.1 dyne/cm°C. The values for $\beta$ were calculated by equation (c), infra, with $T_c$ taken as the surface temperature of the uncoated web during normal coating conditions (except that the web is not being coated). From these factors, the Marangoni numbers and the ratio $\beta d^2/\mu$ were calculated for each of the eight samples produced The presence of Benard Cells was determined by examining the dried samples under an optical microscope, using transmitted light. The value of Rq surface roughness of the magnetic side coating was measured by a WYKO non-contact surface profiler. Light transmissivity of the samples was measured with a light transmissivity sensor from General Electric. Signal amplitude of electromagnetic signal, and drop outs per square inch of a 302 meter sample were measured by a drop out counter commercially available from Metrum, at a setting of 45,000 flux changes per inch, and 65% threshold level.

Table 2 shows that for samples having a Marangoni number greater than approximately 6, Benard Cells form in the dried backside coating. The samples having a Marangoni number below this threshold value do not have Benard Cells. Further, the samples without Benard Cells show significantly fewer dropouts.

TABLE 2

| Sample | Wet Backside Caliper (μm) | Solids % | ICI viscosity (cp) | Surface Roughness of magnetic side (nm) | Light transmission (%) | Reel-to-Reel Amplitude (% of Reference) | $\beta$ (°C./cm) | B = $\beta d^2/\mu$ | Marangoni Number | Benard Cells? | Reel to reel drop-outs |
|---|---|---|---|---|---|---|---|---|---|---|---|
| 1 | 13.9 | 14.0 | 45 | 7.4 | .13 | 108.6 | 7168 | 0.031 | 3.1 | no | 4.8 |
| 2 | 13.5 | 14.0 | 45 | * | .13 | 111.5 | 7407 | 0.030 | 3.0 | no | 4.9 |
| 3 | 13.5 | 14.0 | 45 | * | .13 | 109.8 | 7407 | 0.030 | 3.0 | no | 4.8 |
| 4 | 13.5 | 14.0 | 45 | * | .13 | 109.2 | 7407 | 0.030 | 3.0 | no | 5.7 |
| 5 | 16.5 | 11.6 | 25 | 9.7 | .26 | 94.7 | 6061 | 0.066 | 6.6 | yes | 24.5 |
| 6 | 16.2 | 11.6 | 25 | 9.5 | .33 | 108.5 | 6163 | 0.065 | 6.5 | yes | 15 |
| 7 | 15.9 | 11.6 | 25 | 9.1 | .3 | 107.4 | 6270 | 0.063 | 6.3 | yes | 14.2 |
| 8 | 16.5 | 11.6 | 25 | * | .26 | 108.4 | 6061 | 0.066 | 6.6 | yes | 12.3 |

*Not measured

EXAMPLE 2

Backside dispersions were produced in accordance with the formulation given in Table 3. The ingredients of the Main Charge were combined by mixing the listed ingredients, and sufficient solvent (60/35/5 ratio of MEK/toluene/cyclohexanone) to dilute the solution to 10% solids. These dispersions were milled until smooth. Just prior to coating, the activator charge was combined and added to the main charge.

The dispersions were coated onto a 14 micron PET substrate. After coating, the substrate was passed through an oven and dried without the opposite being coated with a magnetic side coating. The backside-coated substrate was converted to VHS format (1.27 cm wide) for testing.

TABLE 3

| | INGREDIENT | Parts by weight |
|---|---|---|
| Main Charge | Carbon Acetylene black from Chevron Co. (50 nm) | 3.59 |
| | THERMAX N-911 Carbon Black from Cancarb Ltd. (270 nm) | 0.91 |
| | CENTROLEX P Dispersant from Central Soya Corp. (58% solids in 2:1 MEK:toluene | 0.62 |
| | RD 676 Urethane Binder from 3M (30% solids in MEK) | 11.99 |
| | PKHH Phenoxy Binder from Union Carbide (30% solids in MEK) | 5.14 |
| Activator Charge | Dibutyl Tin Dilaurate Catalyst | 0.01 |
| | PAPI Activator from Dow Chemical | 1.42 |
| | Myrisitic Acid (3% solids in MEK) | 0.82 |
| Solvent | MEK | 41.84 |
| | Toluene | 31.41 |
| | Cyclohexanone | 4.5 |

During coating, the wet caliper of the dispersion was adjusted in order to manipulate the Marangoni number while the other coating conditions were held constant. In all of the samples, the thermal diffusivity K of the dispersion was taken to be 0.001 cm²/s, the ICI viscosity was measured as 6 centipoise, and the temperature variation of surface tension was taken to be equal to 0.1 dyne/cm°C.

The values of $\beta$ were determined by equation (c), infra, with $T_c$ taken as the surface temperature of the uncoated web during normal coating conditions (except that the web is not being coated). The substrate was moving at approximately 22.9 cm/s through the drying oven set at 21° C. The values of $T_c$ and $T_s$ were measured approximately 233 cm into the oven, but approximately 446 cm after the coating head.

From these values, the Marangoni number and the ratio $\beta d^2/\mu$ for each sample was calculated. Table 4 compares these results to whether or not Benard Cells were present in the dried backside coating.

TABLE 4

| Sample | Wet Caliper d, (μm) | $\beta$ (°C./cm) | B = $\beta d^2/\mu$ | Marangoni number | Benard Cells |
|---|---|---|---|---|---|
| 1 | 3.25 | 30,770 | 0.054 | 5.4 | no |
| 2 | 3.50 | 28,580 | 0.058 | 5.8 | no |
| 3 | 4.0 | 25,000 | 0.067 | 6.7 | no |
| 4 | 4.5 | 22,220 | 0.075 | 7.5 | no |
| 5 | 4.5 | 22,220 | 0.075 | 7.5 | marginal |
| 6 | 5.5 | 18,180 | 0.092 | 9.2 | yes |
| 7 | 5.75 | 17,390 | 0.096 | 9.6 | yes |
| 8 | 6.0 | 16,670 | 0.100 | 10.0 | yes |
| 9 | 6.25 | 16,000 | 0.104 | 10.4 | yes |
| 10 | 7.0 | 14,290 | 0.117 | 11.7 | yes |
| 11 | 7.25 | 13,790 | 0.121 | 12.1 | yes |
| 12 | 8.75 | 11,430 | 0.146 | 14.6 | yes |
| 13 | 9.75 | 10,260 | 0.163 | 16.3 | yes |

Figure 1:
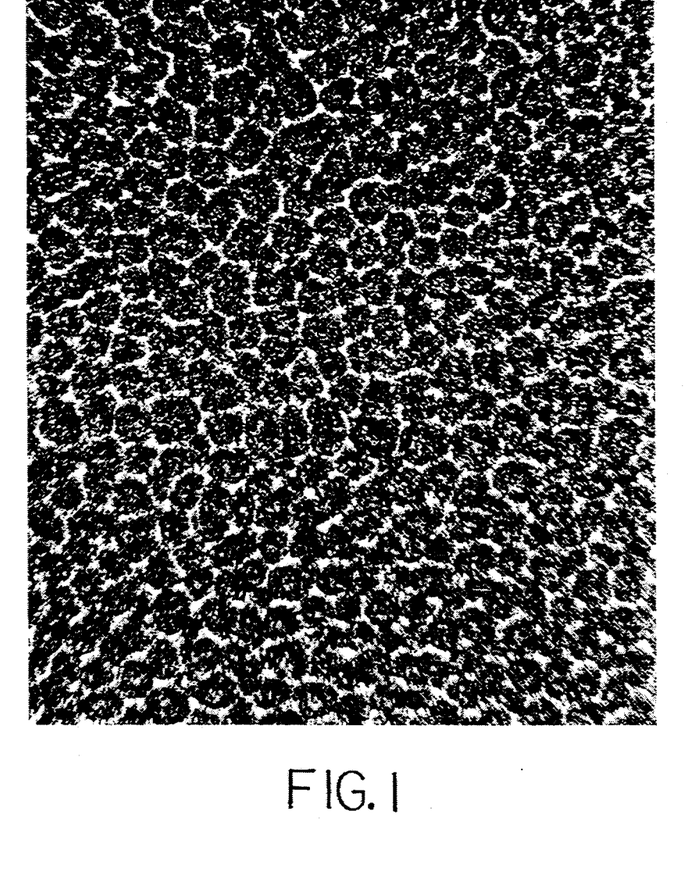
FIG. 1 is a photograph of a backside coating viewed under an optical microscope at 162 X and using transmitted light. The backside coating is Sample 10 of Example 2, which contains Benard Cells.
Figure 2:
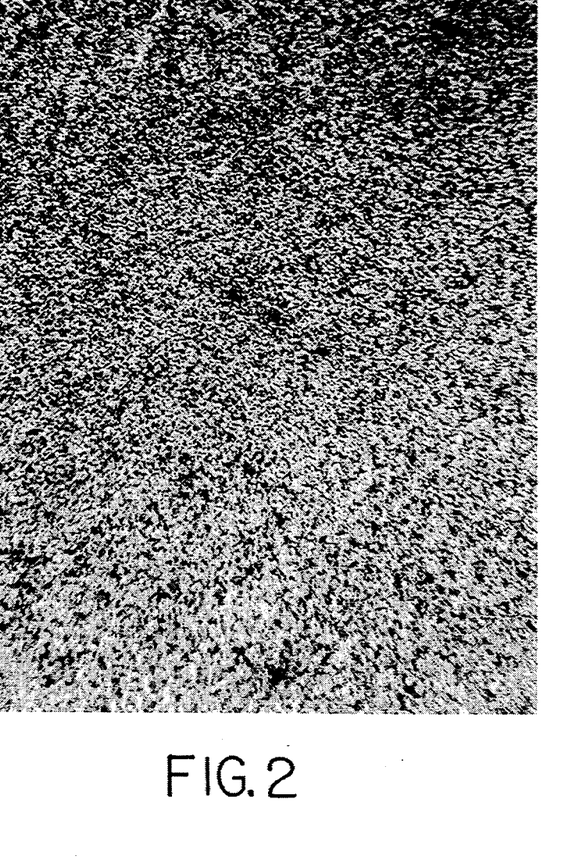
FIG. 2 is a photograph of a backside coating viewed under an optical microscope at 162 X and using transmitted light. The backside coating is Sample 2 of Example 2, which is substantially free of Benard Cells.

Table 4 shows the correlation between wet caliper, Marangoni number and Benard Cells formation. By increasing the wet caliper, the Marangoni number increased. Above the threshold value, $B_T=7.5$, Benard Cells consistently formed in the backside coating. Below 7.5, no Benard Cells were present. FIGS. 1 and 2 are photographs of Sample 10 and 2 respectively, taken under a microscope at 162 X, and with transmitted light. These figures show the presence of Benard Cells in example 10 and the absence of Benard Cells in example 2.

What is claimed is:

1. A method of depositing a magnetic recording media coating onto a substrate, wherein the magnetic recording media coating is substantially free of Benard Cells, the method comprising the steps of:
   (a) providing a dispersion comprising a polymeric binder, a pigment, and a solvent;
   (b) coating said dispersion onto a surface of said substrate;
   (c) drying said dispersion;

(d) calculating values comprising μ, β, and d representing the viscosity, temperature gradient, and wet caliper of said dispersion, respectively; and (e) during the course of carrying out steps (a), (b), and (c), maintaining the ratio $$\frac{\beta d^2}{\mu}$$

below a threshold value sufficient to substantially prevent the formation of Benard Cells in said magnetic recording media coating.

2. A method of depositing a magnetic recording media coating onto a substrate, wherein the magnetic recording media coating is substantially free of Benard Cells, the method comprising the steps of:

(a) providing a dispersion comprising a polymeric binder, a pigment, and a solvent;

(b) coating said dispersion onto a surface of said substrate;

(c) drying said dispersion;

(d) calculating the Marangoni number B of said dispersion according to the formula $$B = \frac{(-d\sigma/dT)\beta d^2}{\mu K}$$

wherein (−dσ/dT), μ, K, β, and d represent the temperature variation of surface tension, viscosity, thermal diffusivity, temperature gradient, and wet caliper of said dispersion, respectively; and (e) during the course of carrying out steps (a), (b), and (c), maintaining said Marangoni number of said dispersion below a threshold value sufficient to substantially prevent the formation of Benard Cells in said magnetic recording media coating.

3. The method of claim 2, wherein said pigment comprises a nonmagnetic pigment.

4. The method of claim 2, wherein said pigment comprises a magnetic pigment.

5. The method of claim 2, wherein said magnetic recording media coating is a magnetic coating.

6. The method of claim 2, wherein the Marangoni number is maintained below said threshold value by adjusting the thermal diffusivity of the dispersion.

7. The method of claim 6, wherein the thermal diffusivity is adjusted by varying the composition of said solvent.

8. The method of claim 2, wherein the Marangoni number is maintained below said threshold value by adjusting the viscosity of said dispersion.

9. The method of claim 8, wherein the viscosity of said dispersion is adjusted by varying the solids percentage of said dispersion.

10. The method of claim 2, wherein the Marangoni number is maintained below a threshold value by adjusting the wet caliper of said dispersion.

11. The method of claim 2, wherein the Marangoni number is maintained below a threshold value by adjusting the temperature gradient of said dispersion.

12. The method of claim 2, wherein said magnetic recording media coating is a backside coating.

13. The method of claim 12, wherein the Marangoni number is maintained below said threshold value by adjusting the thermal diffusivity of said dispersion.

14. The method of claim 13, wherein the thermal diffusivity is adjusted by varying the composition of said solvent.

15. The method of claim 14, wherein the solvent comprises THF, toluene, and MEK.

16. The method of claim 15, wherein the solvent comprises from about 68 to 77 parts by weight THF, from about 4 to 8 parts by weight toluene, and from about 4 to 8 parts by weight MEK, based on 100 parts dispersion.

17. The method of claim 14, wherein the solvent comprises MEK, toluene, and cyclohexanone.

18. The method of claim 17, wherein the solvent comprises 45 to 65 parts by weight MEK, 25 to 40 parts by weight toluene, and 0 to 10 parts by weight cyclohexanone.

19. The method of claim 12, wherein the Marangoni number is maintained below said threshold value by adjusting the viscosity of said dispersion to a value in the range from about 10 to 60 centipoise.

20. The method of claim 12, wherein the Marangoni number is maintained below said threshold value by adjusting the viscosity of said dispersion to a value in the range from about 4 to 8 centipoise.

21. The method of claim 12, wherein the Marangoni number is maintained below said threshold value by adjusting the solids percentage of said dispersion to a value in range from 8 to 17%.

22. The method of claim 12, wherein the Marangoni number is maintained below said threshold value by adjusting the wet caliper of said dispersion to a value in the range from about 13 to 18 μm.

* * * * *

UNITED STATES PATENT AND TRADEMARK OFFICE
CERTIFICATE OF CORRECTION

PATENT NO.: 5,433,973

DATED: July 18, 1995

INVENTOR(S): David A. Wallack, Robert A. Yapel, and David J. Lundberg

It is certified that error appears in the above-identified patent and that said Letters Patent is hereby corrected as shown below:

Column 4, lines 65-66, " 1 " and " 00 " should read -- 100 -- on the same line.

Column 8, line 22, " factor " should read -- factors --.

Column 12, lines 1-2, " 0. " and " 1 " should read -- 0.1 -- on the same line.

Column 12, line 7, " 22:9 " should read -- 229 --.

Signed and Sealed this

Seventeenth Day of October, 1995

Attest:

BRUCE LEHMAN

Attesting Officer

Commissioner of Patents and Trademarks